United States Patent [19]

Frost et al.

[11] 4,420,316

[45] Dec. 13, 1983

[54] FILTER APPARATUS AND METHOD OF MAKING IT

[75] Inventors: Rodney I. Frost, Corning; Wayne H. Pitcher, Jr., Big Flats, both of N.Y.

[73] Assignee: Corning Glass Works, Corning, N.Y.

[21] Appl. No.: 350,998

[22] Filed: Feb. 22, 1982

[51] Int. Cl.$^3$ ............................................. B01D 39/20
[52] U.S. Cl. .................................. 55/523; 55/DIG. 5; 55/DIG. 30; 210/510.1; 29/163.5 F; 60/311; 422/180
[58] Field of Search ................................. 55/482–484, 55/502, 523, DIG. 5, DIG. 30; 210/340, 510; 422/171, 180; 428/116–118; 501/112, 119, 80; 165/8; 252/477 R; 29/163.5 F; 60/295, 299, 311

[56] References Cited

U.S. PATENT DOCUMENTS

| 4,264,346 | 4/1981 | Mann | 55/523 |
| 4,276,071 | 6/1981 | Outland | 55/523 |
| 4,329,162 | 5/1982 | Pitcher, Jr. | 55/523 |

FOREIGN PATENT DOCUMENTS

49-38266 4/1974 Japan .
55-114324 9/1980 Japan .
56-129020 10/1981 Japan .

Primary Examiner—David L. Lacey
Attorney, Agent, or Firm—R. N. Wardell

[57] ABSTRACT

An apparatus for filtering solid particulates from fluid flows having a honeycomb filter body formed by a matrix of thin, interconnected porous walls which define inlet and outlet faces of the body and a plurality of hollow inlet and outlet cells each extending through the body from at least one of the inlet or outlet faces, the thin walls having internal interconnected open porosity sufficient to allow the fluid to travel completely across the thin walls in their narrower dimension and through the thin walls in their longer dimensions between the inlet and outlet cells and to prevent at least a significant portion of the solid particulate material carried by the fluid from passing either completely across or through the walls. Solid particulate filtering occurs on all thin wall surfaces of the inlet cells regardless of whether those thin walls are shared with adjoining inlet or outlet cells. Also a method of fabricating the apparatus comprising providing the matrix, forming the inlet cells by closing them at the outlet face and forming the outlet cells by closing them at the inlet face.

14 Claims, 10 Drawing Figures

FILTER APPARATUS AND METHOD OF MAKING IT

BACKGROUND OF THE INVENTION

The invention relates to filters for trapping solid particulates present in fluid streams and, in particular, to filters formed from thin porous walled, honeycomb structures.

The removal of solid particulates from fluids, gases or liquids, in which the particulates are mixed is typically accomplished by means of filters made from solid materials which are formed into articles or masses having a plurality of pores of small cross-sectional size extending therethrough, which may be interconnected, such that the solid materials are both permeable to the fluids which flow through the article or mass and capable of restraining most or all of the particulates mixed in the fluid from passing through the article or mass, as desired. Such pores constitute what is termed "open porosity" or "accessible porosity". The particulates are collected on the inlet surface(s) and/or within the pores of the material. The minimum cross-sectional size of some or all of the pores can be larger than the size of some or all of the particulates to be removed from the fluid, but only to the extent that significant or desired amounts of sufficiently large particulates become trapped on or within the filters during the transit of contaminated fluid. As the mass of collected particulates increases, the flow rate of the fluid through the filter generally decreases to an undesirable level. The filter is then either discarded as a disposable, replaceable element or regenerated by suitably removing the collected particulates so that it may be reused.

Certain considerations are helpful in evaluating and comparing filters. One is filter efficiency, the amount of the suspended particulates of concern that are removed from the fluid as it passes through the filter, usually expressed as a weight percentage of the total particulates of concern in an equal volume of fluid prior to its passing through the filter. Another consideration is flow rate, the volume of fluid per unit of time that passes through the filter and collected particulates. In a closed, continuous feed system, the consideration comparable to flow rate is pressure drop, that is the difference between the fluid pressure upstream and downstream from the filter caused by the presence of the filter and particulates thereon. Yet another consideration is operating time, the cumulative time of service of a filter before its flow rate/back pressure become unacceptable so as to necessitate replacement and/or regeneration of the filter. Lastly, there is capacity, the amount of particulate collected by the filter before an insufficient flow rate or excessive pressure drop is reached. Other desirable features of the filter include compact structure, mechanical integrity, chemical inertness or nondeleterious reaction with the fluid flow and particulate material.

It has been known for some time that honeycomb structures having a plurality of hollow passages or cells extending through them, which are formed in whole or in part by thin porous interconnected walls, may be successfully employed in filtering applications. U.S. Pat. Nos. 4,060,488, and 4,069,157 describe fluid filtering apparatus constructed by applying to a porous support body such as a thin porous walled honeycomb structure, a suitable filtering membrane. The membrane allows a portion of a fluid solution or mixture, which is transported through the honeycomb structure passages supporting the membrane, to pass into the porous support structure. The filtrate fluid migrates through the open porosity of the support structure to an internal reservoir or to an outer surface of the structure where it is removed.

U.S. Pat. Nos. 4,041,591 and 4,041,592, assigned to the assignee hereof, describe multiple flow path bodies and methods for fabricating the same from honeycomb structures having columns or layers of hollow cells which extend in a substantially mutually parallel fashion through the structure and which are formed by a plurality of thin intersecting walls. The structure is modified so that two separate fluids may be transported through alternate columns or layers of cells. It is suggested that the described multiflow path body might optionally be used in filtration and osmotic separation applications by using porous materials to produce the original honeycomb structure. As described, the device would function like those of the aforesaid U.S. Pat. Nos. 4,060,488, and 4,069,157 which allow only a fraction of a fluid which is passed through the alternate columns or layers of cells to migrate across the thin porous walls into the adjoining interleaved columns or layers of cells while the remainder of the fluid, having a higher concentration of contaminant or separable constituent, can continue to pass through and exit the structure.

Porous walled honeycomb structures may also be used directly to filter all or substantially all of the solid particulates from all fluid passed through the structure. Application Ser. No. 165,646, filed July 3, 1980 and assigned to the assignee hereof, and U.S. Pat. No. 4,276,071 both describe filters formed from honeycomb structures, themselves formed by matrices of thin porous intersecting walls, which define a pair of open, opposing end faces and a plurality of hollow, substantially mutually parallel passages or cells extending longitudinally through the structure between the end faces. At each end face where the open transverse areas of the cells would normally be exposed, the ends of alternate cells are blocked in a checkered or checkerboard pattern. The pattern is reversed at either end face so that each cell of the structure is blocked at only one end face and shares common thin walls and adjoining cells which are blocked only at the opposing end face of the structure. A contaminated fluid is introduced under pressure to a "inlet" end face of the filter body and passes into those cells open at the inlet end face (i.e. "inlet" cells). Because the inlet cells are closed at the opposing "outlet" end face of the structure, the contaminated fluid is forced to pass across the narrow dimension of the thin, porous walls into the adjoining "outlet" cells which are all blocked at the inlet end face and open at the outlet end face of the structure. Solid particulate matter which is sufficiently large is deposited on the thin wall surfaces defining the interior of the inlet cells or is trapped in the pores of the thin walls. All of the contaminated fluid passing through the structure is filtered and all of the thin walls of the structure are utilized in the described manner of filtering. U.S. Pat. No. 4,276,071 also describes a second crossflow-type honeycomb filter embodiment in which layes of longitudinally extending and laterally extending passages are alternately stacked. Diesel exhaust gas containing carbonaceous solid particulate contaminant is passed into either end of one of the two commonly extending sets of passages and is recovered after filtering from the remaining set of interleaved commonly extending passages. As only the thin walls separating the lateral and longitudinal layers of cells are porous, filtration occurs only through the thin walls shared in common between adjoining inlet and outlet passages. Accordingly, this device is only about one-half as efficient as a comparably sized and dimensioned honeycomb structure incorporating the previously described checkered pattern of alternate cells.

SUMMARY OF THE INVENTION

It is an object of the invention to provide a filter of honeycomb structure having inlet and outlet passages or cells which utilizes all internal surfaces of the inlet cells for filtering regardless of the relative arrangement of inlet and outlet cells in the structure.

It is yet another object of the invention to accomplish the previously named object while filtering all fluid passed through the filter.

According to the invention, these and other objects are accomplished by providing a honeycomb structure, the internal passages or cells of which are formed by interconnected thin walls having internal interconnected open porosity of a volume and size sufficient to enable a fluid being filtered to pass not only completely across the narrow dimensions of the thin walls between adjoining cells but also through the longer dimensions of the walls while preventing at least a significant portion, which may be less than 50%, if desired, of the solid particulate contaminant in the fluid from passing either completely across or through the walls. The interconnected open porosity allows filtration to occur along all of the thin wall surfaces of a cell into which a fluid contaminated with solid particulate matter is introduced, regardless of the nature of adjoining cells with which the cell shares common thin walls.

In particular, the invention is an apparatus for filtering solid particulates from fluid streams, gas or liquid, which comprises a honeycomb structure formed by a matrix of thin, interconnected porous walls defining inlet and outlet end faces of the structure and a plurality of cells each extending through the structure from at least one of the inlet or outlet end faces. All or substantially all of the cells of the structure belong to either an inlet group or an outlet group. Each cell of the inlet group is open at at least one inlet end face and closed where it adjoins any outlet end face. Each cell of the outlet group is closed where it adjoins any inlet end face and open at at least one outlet end face. According to an important feature of the invention, all or substantially all cells of the inlet group each shares at least one or more of its defining thin walls in common with other, adjoining inlet cells. The remaining inlet cell defining thin walls are shared in common with adjoining outlet cells. The thin walls are provided with internal interconnected open porosity of a volume and size sufficient to enable the fluid being filtered to flow completely through the longer dimensions as well as across the narrow dimensions of the thin walls while restraining at least a significant portion of the particulates desired to be removed from the fluid from passing completely across or through the thin walls in any direction. Thus, fluid entering each inlet cell passes across the narrow dimensions of the thin walls shared in common between adjoining inlet and outlet cells and through the thin walls shared in common between adjoining inlet cells into interconnected thin walls forming outlet cells of the filter. Particulate filtration is thus provided by all thin walls defining each inlet cell, regardless of the nature of the adjoining cell (i.e. inlet or outlet) with which the thin walls are shared.

According to an important aspect of the invention, the thin walls are provided with an internal open pore volume greater than about 25%, desirably at least about 35% and preferably between 40 and 70% of their bulk volume to assure fluid flow through their longer dimensions and to minimize hydraulic back pressure.

In exemplary use, automotive diesel exhaust particulate filtration, honeycomb filters are provided according to the present invention, preferably with their cells extending in a uniform direction through the filter between one inlet and outlet end face. The transverse cross-sectional density of the cells is desirably at least about 1.5 cells/cm.$^2$ and preferably at least about 15.5 cells/cm.$^2$ for maximizing filter surface area within a compact structure. Cellular densities are also desirably less than about 46.5 cells/cm.$^2$ and preferably about 31 cells/cm.$^2$ or less to provide adequate, unrestricted channel area to reduce filter back pressure. Open porosity in the thin walls may be provided by pores having diameters of between about 1 and 60 microns (i.e. micrometers) and preferably between about 10 and 50 microns.

The thin walls of the diesel particulate filters are provided in thicknesses of at least about 0.05 millimeters and preferably between about 0.25 and 0.76 millimeters to provide adequate thin wall strength. Wall thicknesses are also desirably less than about 1.5 millimeters to minimize filter volume and to preclude possible thermal shock problems.

DETAILED DESCRIPTION OF THE INVENTION

Figures 1, 2:
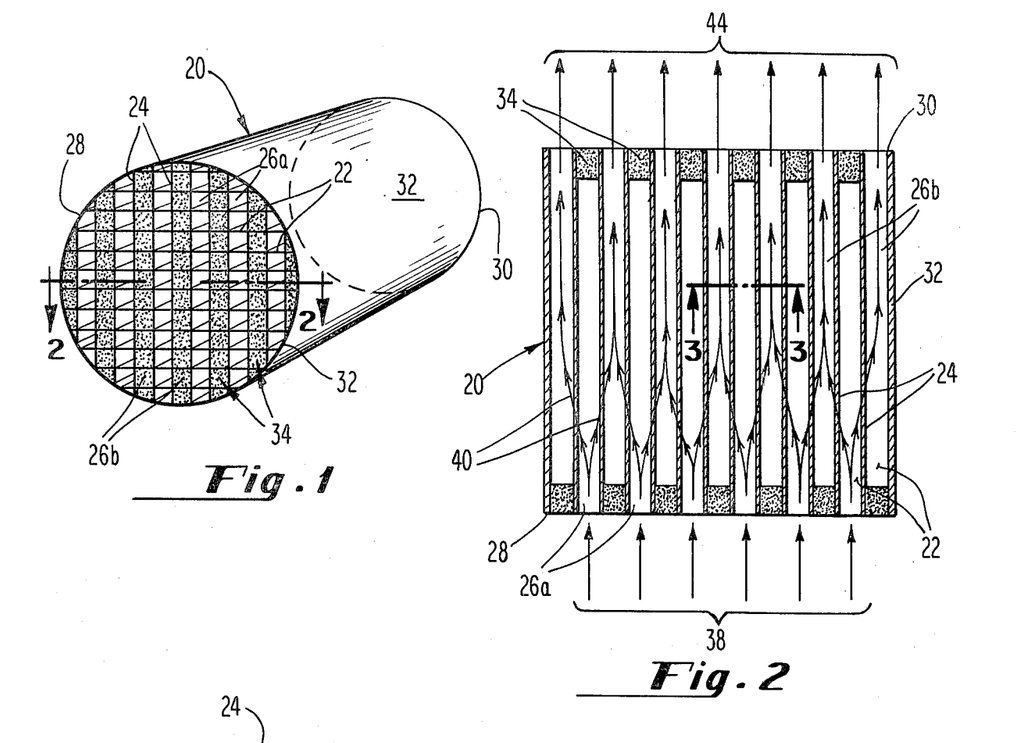
FIG. 1 is an oblique view of one exemplary embodiment filter body according to the present invention.
FIG. 2 is a lateral view of the filter body of FIG. 1 taken in the plane indicated by the line 2—2 sectioning columns of inlet and outlet cells of the filter body of FIG. 1.
Figure 3:
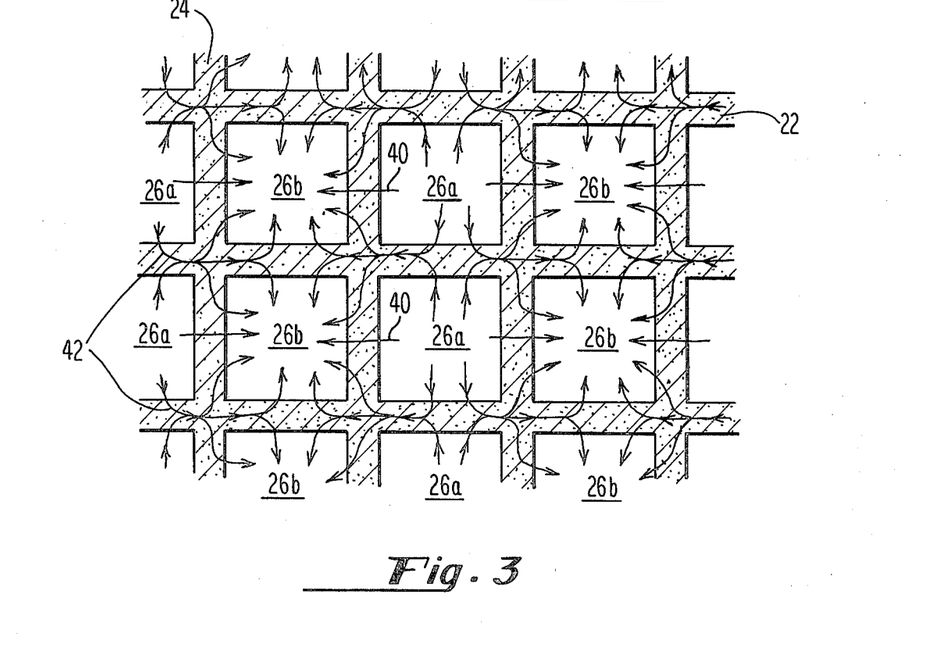
FIG. 3 is a greatly expanded transversely sectioned view taken within the filter body of FIG. 1 and along the line 3—3 of FIG. 2 depicting fluid flow between and among the adjoining alternate columns of inlet and outlet cells.
Figure 4:
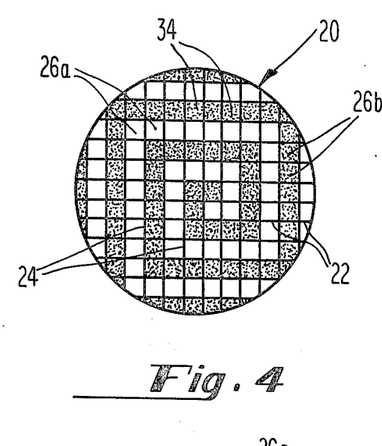
FIGS. 4-6, inclusive, are end face views of three other filter bodies according to the present invention depicting different arrangements of inlet and outlet cells.
Figure 5:
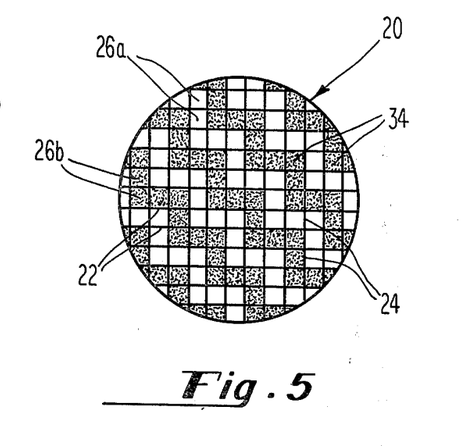
Figure 6:
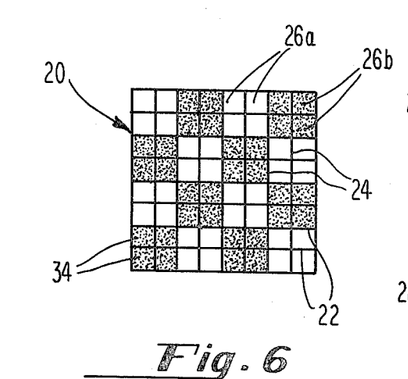

FIGS. 1 through 3 are various views of an exemplary embodiment of a filter body 20 according to the present invention. The filter body 20 comprises a cellular or honeycomb structure formed by a matrix of thin, porous, intersecting vertically extending walls 22 and horizontally extending walls 24 which define a multiplicity of cells 26a and 26b extending in a substantially longitudinal and mutually parallel fashion through the body 20 between an inlet end face 28 and outlet end face 30. The walls 22 and 24 are in all respects indentical but are separately designated to later explain fluid flow between and among the cells 26a and 26b. Desirably, the body 20 is also provided with a smooth peripheral outer surface or skin 32 which surrounds the matrix of thin walls 22 and 24 and extends between the inlet and outlet end faces 28 and 30. Less desirably, the outermost thin walls 22 and 24 forming the peripherally located cells may serve as the longitudinal outer surface of the body 20 or only partially enclosed peripheral cells may be provided. Each of the cells 26a and 26b are closed near one of the end faces 28 or 30 by a suitable closure means such as a sealant or cement plug 34 which adheres to the thin walls 22 and 24 and extends from the end face 28 or 30 a short distance inward towards the middle of the filter 20. Closure means covering but not extending into the end of the selected cell at the end face may alternatively be used. Alternate columns of cells 26b have been sealed with plugs 34 at the inlet end face 28 and constitute an outlet group of cells each of which is open at the outlet end face 30. The cells 26a of the remaining alternate columns are sealed with similar closure means 34 at the opposing end face 30 and constitute an inlet group of cells each of which is open only at the inlet end face 28. Thus, the sealing patterns of the cells are reversed at either end face 28 and 30. Because the cells 26a and 26b have substantially identical uniform transverse cross-sectional areas and geometries and because substantially equal numbers of cells are closed at either end face of the structure, it is immaterial which end face 28 or 30 is used as the inlet or outlet end face of the filter. However, as will later be explained with respect to the preferred embodiments of the invention, providing greater collective inlet cell thin wall surface area than collective outlet cell thin wall surface area may increase the capacity and operating life of the filter.

The thin walls 22 and 24 can be made of any suitable material that provides the requisite interconnected open porosity which allows the fluid to flow across the narrow dimensions of the thin walls 22 and 24 between adjoining cells and through the longer dimensions of the thin walls between adjoining or neighboring cells and to restrain at least a significant portion of the solid particulates contaminating the fluid (or those which are objectionably large) from passing entirely across or through the thin walls in any direction. The materials may include powdered metals, glasses, ceramics (generally crystalline) resins or organic polymers, papers or textile fabrics (with or without fillers), etc. and combinations thereof including, for example, glass-ceramic mixtures and cermets. It is preferred to fabricate the thin walls 22 and 24 and skin 32 from plastically formable and sinterable finely divided particulates and/or short length fibers of substances that yield a porous sintered material after being fired to effect the sintering thereof, especially powdered metals, glasses, ceramics, glass-ceramics, cermets or other ceramic based mixtures. In addition to volatizable plasticizers and/or binders, which may be used to prepare a workable batch mixture, any suitable or conventional fugitive or combustible (burn-out) additive can be dispersed within the formable and sinterable mixture so as to provide appropriate and adequate interconnected open porosity in the sintered material of the intersecting thin walls 22 and 24. The requisite open porosity can be designed into the thin walls 22 and 24 by raw material selection as described in U.S. Pat. No. 3,950,175. Although the matrix of thin walls 22 and 24 may be fabricated by any suitable technique for the material selected, it is preferably formed monolithically with a skin 32 by extrusion from a sinterable mixture in a manner as disclosed in U.S. Pat. Nos. 3,790,654, 3,919,384, and 4,008,033 and a pending application Ser. No. 260,343 filed May 4, 1981, U.S. Pat. No. 4,364,888, assigned to the assignee hereof and incorporated by reference herein.

The cell ends may be closed with any material and in any manner compatible with the material of the thin walls 22 and 24 under the envisioned service conditions of the filter 20. This includes non-deleterious reaction to the thin wall material and the contaminated fluid, either singularly or in common, good adhesion to the thin walls, suitable durability to the fluid flows at the desired flow rates, similar coefficients of thermal expansion (if the filter is to be used at elevated temperatures), etc. Typically, plugs 34 are formed by charging a flowable or formable plugging material into selected cell ends and then performing steps such as curing, drying, firing, etc. which transform the flowable/formable material into a solid closure which adheres mechanically and/or chemically to the cell walls and completely cover or fill the cell end. The plugs 34 or other closure means may be either porous or non-porous, although in the former case, the open porosity and/or mean pore size should not be so great as to allow the passage of solid particulate contaminant or objectionably large contaminant through or around the plugs 34 and hence through the filter 20.

Where a sinterable honeycomb structure is used, compatible sinterable cement mixtures are typically used to form plug-type closure means. Methods and apparatus for charging flowable and/or formable materials such as sinterable cement mixtures into selected cell ends of a rigid honeycomb structure are described in the aforesaid application Ser. No. 165,646 and in the following pending applications which are assigned to the assignee hereof and incorporated by reference herein: Ser. No. 283,733, Ser. No. 283,732, Ser. No. 283,734, and Ser. No. 283,735, all filed July 15, 1981, and Ser. No. 295,610, and Ser. No. 295,611 both filed Aug. 24, 1981. Generally, these methods and/or apparatus may be used with either green (i.e. dried but not sintered) or sintered honeycomb structures or other rigid, nonsinterable honeycomb structures. Sinterable cement mixtures may also be used with green (i.e. sinterable) honeycomb structures if their sintering temperatures are sufficiently close to that of the structure, as is described in another pending application Ser. No. 295,611 filed Aug. 24, 1981 or a cement having a lower sintering temperature may be charged into a previously fired structure having a higher sintering temperature, as is described in the aforementioned application Ser. No. 165,646. Dimensional change (typically shrinkage although possibly expansion) of the sinterable substrate and/or plugging material(s) upon drying and/or sintering may be compensated for by using a plugging material which foams when fired during sintering, such as the foam-type ceramic cements described in U.S. Pat. Nos. 3,189,512 and 3,634,111 and in application Ser. No. 165,647, filed July 3, 1980 (now U.S. Pat. No. 4,297,140), all assigned to the assignee hereof, or a plugging material which undergoes an appropriate net relative expansion with respect to the structure, such as is described and claimed in the aforesaid pending application Ser. No. 295,611, all being incorporated by reference herein.

FIGS. 2 and 3 illustrate fluid flow through and across the thin walls 22 and 24 of the filter 20 of FIG. 1. FIG. 2 shows the fluid flow along a horizontal row of the cells 26a and 26b of the filter body 20 of FIG. 1. In this view, inlet cells 26a, which are open at the inlet end face 28 and closed at the outlet end face 30, and outlet cells 26b, closed at the inlet end face 28 and open at the outlet end face 30, are alternated with one another. A contaminated fluid 38 is introduced under pressure to the inlet end face 28 and passes into the inlet cells 26a. Because of the presence of the plugs 34 at the outlet end face portion of the inlet cells 26a, the fluid is forced through the pores forming the interconnected open porosities of thin cell walls 24 and into the adjoining outlet cells 26b, as indicated by arrows 40. While the fluid passes entirely across the thickness (i.e. narrow dimension) of cell walls 24, their requisite open porosity restrains at least a significant portion, as desired, of the solid particulate contaminant present in the inlet fluid flow from passing completely across or through the walls 24. Filtered fluid exits the filter 20 through the outlet end face 30 via the outlet cells 26b, as is represented by arrows 44. Because of their interconnected porosity, there is also flow of the fluid through the longer dimensions of the thin walls 22 and 24, as will now be more fully explained with reference to FIG. 3.

FIG. 3 is a greatly expanded internal view of the filter body 20 transverse to the central longitudinal axes of the cells 26a, and 26b depicting fluid flow between alternating columns of the inlet cells 26a and outlet cells 26b. Again, the fluid flow across the narrow dimensions of the thin walls 24 between adjoining inlet 26a and outlet 26b cells is indicated by arrows 40. Due to their interconnected open porosity, the fluid flows through the longer dimensions of the thin walls 22 and 24 (i.e. between the outer planar surfaces of and within the thin walls 22 and 24 defining the inner surfaces of the cells 26a and 26b). Thus, fluid in the inlet cells 26a enters the horizontal thin walls 24 separating adjoining inlet cells 26a and travels laterally in either direction to adjoining or neighboring (i.e. cells not sharing any thin wall in common) outlet cells 26b. The fluid may also flow through the remaining longer dimensions of the thin walls 22 and 24 (i.e. in the vertical direction in FIG. 2 and normal to the plane of FIG. 3) in migrating from the inlet cells 26a to the outlet cells 26b and/or to the outlet end face 30. If the walls 22 and 24 are of uniform thinness, primary flow of the incoming fluid will be across the vertically extending walls 24 separating the adjoining columns of inlet and outlet cells 26a and 26b in FIGS. 1-3, as that pathway offers the least initial resistance. As a layer of solid particulate begins building up on the vertical thin wall 22 surfaces of the inlet cells 26a, back pressure to flow across those walls increases and tends to equalize with that through the horizontal thin walls 24 between the adjoining inlet cells 26a. Flow through the various sections of thin walls 22 and 24 forming the inlet cells 26a will constantly adjust as solid particulate is built up on any particular inner wall surface or portion of an inner wall surface of an inlet cell 26a. Again, the interconnected open porosity prevents at least a significant portion of the particulates from flowing through the longer dimensions of the thin walls between adjoining or neighboring cells.

The particular honeycomb filter body 20 depicted in FIGS. 1 through 3 is exemplary. Other exemplary plugging patterns utilizing the subject invention including exemplary preferred plugging patterns, are illustrated in end face views in FIGS. 4 through 9. Inlet and outlet cells 26a and 26b, inlet end face 28, closures 34 and thin walls 22 and 24 of filters 20 of FIGS. 4 through 9 are the same as those previously described with respect to FIGS. 1 through 3. The thin walls of the filter 20 of FIG. 9 have been further subdivided into horizontal classes 22a and 22b and vertical classes 24a and 24b, for reasons later explained. The plugging patterns depicted in FIGS. 4 through 9 are reversed on the opposing (hidden) end face of the filters. Also, while it is convenient to form the cells 26a and 26b with substantially square cross-sectional geometries in row and column arrangements of cells or with other cross-sectional geometries formed by intersecting parallel planes such as triangles, rectangles, and parallelograms, etc., other polylateral, equilateral or closed curve shapes (e.g. circles, ellipses) and cellular arrangements other than rows or rows and columns of cells may be employed. In accordance with the aforesaid application Ser. No. 165,646, it is preferred that the cells not have any internal angles less than about 30° as the surfaces forming such acute angles tend to become blocked with particulate more easily than would more obtusely oriented intersecting thin walls.

Figure 7:
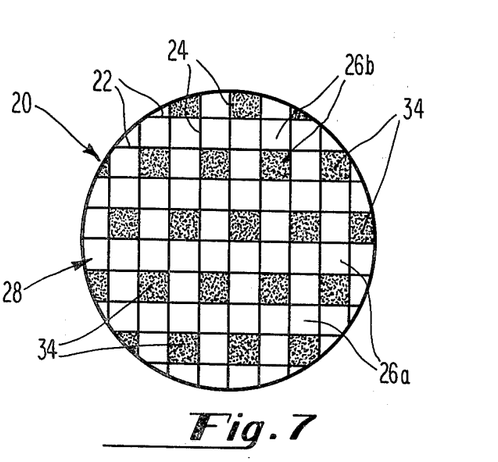
FIGS. 7-9 are end face views of alternate exemplary preferred embodiments of the present invention having different transverse cross-sectional cell geometries and/or arrangements of inlet and outlet cells illustrating asymmetric collective inlet and outlet cell thin wall surface areas.
Figure 8:
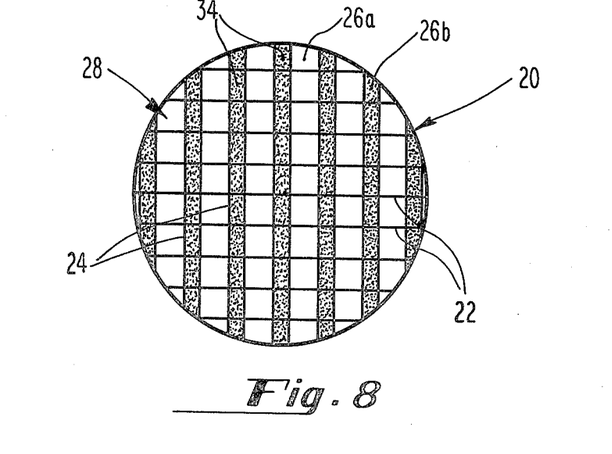
Figure 9:
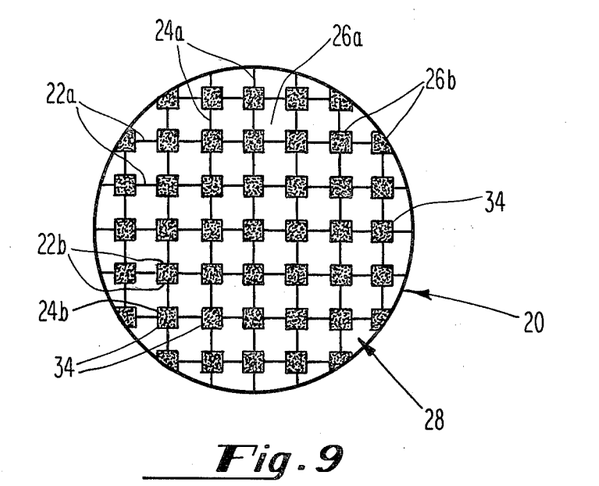

The best modes for practicing the present invention are in the provision of greater collective inlet cell thin wall surface area than collective outlet cell thin wall surface area, as is described and claimed in copending application Ser. Nos. 350,995 and 350,994 filed on the same date as this application and assigned to the assignee hereof, which are incorporated by reference herein. According to application Ser. No. 350,995, the collective thin wall surface area of the inlet cells is significantly greater, preferably between about two to four times greater for diesel exhaust particulate filtration, than the collective cell wall area of the outlet cells. Achieving these surface area differences necessarily requires that all or substantially all of the inlet cells share thin walls in common with other inlet cells. FIGS. 7 and 8 depict plugging patterns at the inlet end faces of exemplary honeycomb filter bodies according to this first preferred embodiment of the subject invention. In FIG. 7 the inlet end face of a preferred filter 20 is depicted showing substantially identical vertical and horizontal thin walls 22 and 24, inlet and outlet cells 26a and 26b formed by the thin walls 22 and 24 and plugs 34 formed at the ends of the outlet cells 26b. With the exception of those along the periphery of the end face, the cells 26a and 26b are of substantially identical transverse cross-sectional geometries. A much greater portion (approximately 75%) of the cells have been formed as inlet cells, open at the depicted inlet end face and closed at the opposing (hidden) outlet end face of the filter 20. FIG. 8 similarly depicts an inlet end face of a filter 20 having inlet and outlet cells 26a and 26b, respectively, formed from intersecting thin walls 22 and 24. The outlet cells 26b are closed with plugs 34 at the depicted end face while the inlet cells 26a are similarly closed at the opposing outlet end face (hidden) of the filter. In FIG. 8, greater collective inlet cell than outlet cell thin wall surface area has been provided by forming equal numbers of inlet cells 26a and outlet cells 26b with different open transverse cross-sectional areas, the inlet cells 26a having larger transverse cross-sectional areas and the outlet cells 26b (plugged with means 34 at the depicted inlet end face) having smaller transverse cross-sectional areas. According to the other preferred embodiment of the subject invention (aforesaid application Ser. No. 350,994) and as is depicted in FIG. 9, a honeycomb filter 20 is again provided with a first subset of inlet cells 26a plugged at the opposing, hidden outlet end face of the filter 20 and having substantially larger individual transverse cross-sectional areas than the areas of a subset of outlet cells 26b plugged with means 34 at the depicted inlet end face. The outlet cells 26b are located at ends of the thin walls 22a and 24a lying between adjoining inlet cells 26a and provide increased thermal shock resistance to the structure as compared to simple polylateral cell shapes such as squares, rectangles, other parallelograms and triangles formed by intersecting subsets of parallel thin walls extending continuously across the end faces. In addition, thin walls 22b and 24b forming the outlet cells 26b differ in thickness from the walls 22a and 24a separating and defining adjoining inlet cells 26a so as to differentially control fluid flow through and across the thin walls 22a, 22b, 24a and 24b to equalize filtration on all inlet cell 26a surfaces or to maximize fluid flow through the filter 20.

The composition of the thin walls, as well as their physical parameters, including their dimensions, percent open porosity and mean pore size, will vary to satisfy the users operating requirements such as filter strength, durability and efficiency; contaminant size and concentration; fluid flow rate, density and viscosity; etc. Envisioned uses for the invention include diesel exhaust gas and molten metal filters and heat exchangers as are described in the aforesaid copending application Ser. No. 165,646.

DIESEL PARTICULATE TRAP FILTERS

Figure 10:
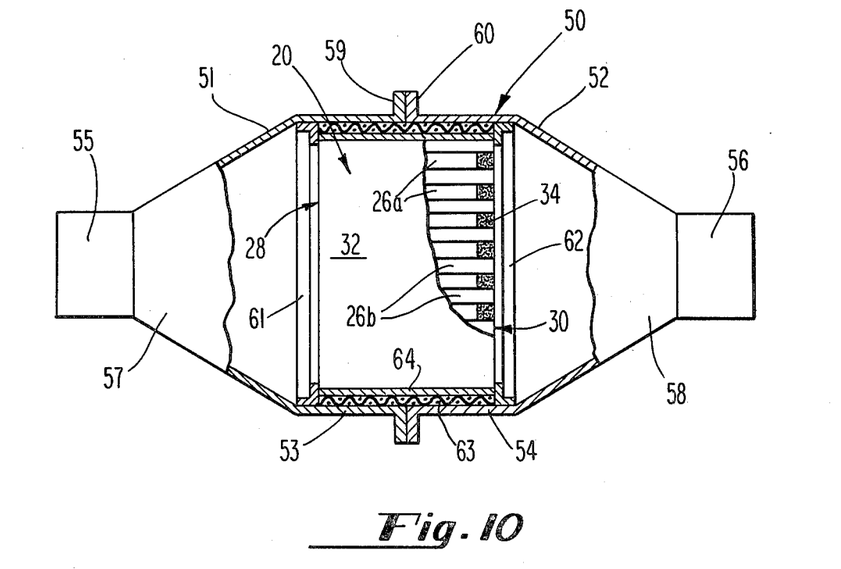
FIG. 10 is a partially broken away view of an apparatus for the filtration of particulates from diesel engine exhaust gas showing a partially broken away filter of the present invention.

A desirable use of the present invention is for the removal of carbonaceous particulates from diesel engine exhaust gas so as to avoid air pollution by such particulates, which individually can range in size from about 5 micrometers or microns down to and below 0.05 microns. FIG. 10 shows an exemplary form of such apparatus, which comprises the filter 30 held within a container or can 50. The filter 20 may be any of those depicted in FIGS. 1 through 9, or any other according to the teachings of this invention having inlet cells 26a and outlet cells 26b extending between opposing inlet and outlet end faces 28 and 30, respectively, formed by thin walls having the requisite open porosity and closed by plugs 34 or other suitable means. A skin 32 has also been provided as the outer surface of the filter 20 between the end faces 28 and 30. The can 50 is similar to a conventional type of can employed for mounting catalytic converter honeycomb substrates in exhaust systems of internal combustion engines as is described, for example, in U.S. Pat. No. 3,441,381. The can 50 comprises two parts 51 and 52 respectively formed of filter-holding portions 53 and 54, conduit-connectors 55 and 56, conical portions 57 and 58 respectively joining connectors 55 and 56 to portions 53 and 54, and mating flanges 59 and 60 which are mechanically fastened together (e.g. by bolts and nuts not shown) to keep the can 50 properly assembled for use and so as to be capable of being unfastened in order to open the can 50 for replacement of filter body 20. Internal annular mounting members 61 and 62 of L-shaped cross-section are respectively fastened to portions 53 and 54 so as to respectively abut against end faces 28 and 30 and hold body 20 in its proper fixed axial position within can 50. To cushion body 20 against mechanical shock and vibration, it is ordinarily desirable to surround body 20 with a wrapping or mat 63 of metal mesh, refractory fiber or the like, which may fill the annular space between body 20 and portions 53 and 54. To minimize heat loss from body 20 and excessive heating of portions 53 and 54, a layer of insulating material 64, such as glass or mineral wool mat, may also be wrapped around body 20.

Connectors 55 and 56 are suitably fastened (e.g. by welding or mechanical coupling) to upstream and downstream portions, respectively, of the exhaust gas pipe of a diesel engine. While the can 50 can be located in and form part of the exhaust gas conduit some distance downstream from the engine exhaust manifold, it desirably can be located near or at the exit from the exhaust manifold. The latter arrangement facilitates regeneration of filter 20 by utilizing the higher temperature of the exhaust gas upon exiting the exhaust manifold to cause, with excess air in the exhaust gas, the combustion of carbonaceous particulates restrained in filter 20. The gaseous combustion products formed during regeneration can then pass on through and out of filter 20 for emission through connector 56 to the tailpipe (not shown) fastened to connector 56. If desirable (especially when can 50 is located downstream along the exhaust conduit some distance from the exhaust manifold), a combustion ignition device may be positioned in can 50, such as a glow plug in conical portion 57 or an electric heater within the central axis of filter 20 (similar to the device of U.S. Pat. No. 3,768,982), and secondary air may be injected into can 50 upstream from filter 20 to assist in regeneration of filter 20 without removing it from can 50. Additionally, catalyst substance can be placed on and in thin walls 22 of filter 20 (similar to catalytic converter honeycomb substrates) to facilitate regeneration combustion in filter 20. In ordinary usage, frequent higher speed or rpm of the diesel engine can contribute sufficient heat (e.g. 400°–500° C. or higher) requiring less frequent replacement of filter 20. Nevertheless, removed filters 20 can be reverse flushed with air to blow much of the trapped particulates out of it into a collector bag and then fully regenerated by high temperature air passed through it before reinstalling in can 50.

Cordierite ceramic materials of the type disclosed in U.S. Pat. Nos. 3,885,977 and 4,001,028 are generally preferred for diesel particulate trap filters because, as was earlier found in their use as catalyst substrates in internal combustion engine exhaust systems, these materials have properties which enable them to withstand and be durable under the thermal, chemical and physical conditions to which they are subjected in automotive exhaust systems including those of diesel engines.

Several sample diesel exhaust particulate filters were prepared in the different cellular densities and thin wall thickness variations listed in Table 1, below.

For diesel particulate filtering with these materials, honeycomb structures having cellular densities between about 10 and 300 cells/in.$^2$ (about 1.5 to 46.5 cells/cm.$^2$) are believed useful and between about 100 and 200 cells/in.$^2$ (about 15.5 to 31 cells/cm.$^2$) are preferred to provide sufficient thin wall surface area in a compact structure. Wall thicknesses can vary upwards from the minimum dimension providing structural integrity, about 0.002 in. (about 0.05 mm.). Thicknesses should be less than about 0.06 in. (1.5 mm.) to minimize filter volume. A range of between about 0.010 and 0.030 inches (about 0.25 and 0.76 mm.) appears particularly useful with these materials at the preferred cellular densities. Interconnected open porosity of the thin walls may vary, but should be greater than about 25% of thin wall volume and preferably greater than about 35% to allow fluid flow through the thin wall longer dimensions. Diesel filter integrity becomes questionable above about 70% open pore volume. For diesel particular filtration it is believed that the open porosity may be provided by pores within the walls having means diameters in the range of about 1 to 60 microns with a preferred range between about 10 and 50 microns. Filtration efficiencies up to and in excess of 90% of the diesel exhaust particulates (by weight) can be achieved with the described cordierite materials. The filtration of a lesser but still significant portion (i.e. less than 50%) of the particulates may be desirable for other filtering applications including exhaust filtering of smaller diesel engines as is described in a copending application Ser. No. 353,803 filed with this application, assigned to the same assignee and incorporated by reference herein, and may also be achieved with the described cordierite materials. Efficiencies, of course, will vary with the range and distribution of the size of the particulates contaminating the fluid. Volumetric porosity and mean pore size are determined by conventional mercury-intrusion porosimetry.

TABLE 2-continued

| FILTER TYPE | OPEN POROSITY (% Vol) | MEAN PORE DIAMETERS (Microns) |
|---|---|---|
| 100 cells/in.$^2$-0.025 in. (15.5 cells/cm.$^2$-0.635 mm.) | 53.4 | 13 |
| Sample 6 | | |
| 200 cells/in.$^2$-0.012 in. (31 cells/cm.$^2$-0.305 mm.) | 49.0 | 13 |

Each sample filter was cylindrical, approximately 12 inches (about 30.5 cm.) in length and 3.66 in. (about 9.4 cm.) in diameter with cellular densities ranging between about 50 and 200 cells/in.$^2$ (about 7.75 and 31 cells/cm.$^2$). The Sample 1 through 6 filters of Table 1, above, were prepared in the manner described in the application Ser. No. 165,646: to wit, cylindrical honeycomb substrates were formed by extrusion from batch mixtures identified in TABLE I of the Ser. No. 165,646 application (Samples 1-3, 5 and 6 of Table 1, above, from the composition listed for Samples D-E-F-G-H of the Table I and Sample 4 of Table 1, above, from the composition listed for Sample I-J-K of that TABLE I) and fired in accordance with the schedule listed therein to effect their sintering; alternate rows of cells were

TABLE 1

| | ALTERNATE ROW PLUGGED FILTERS | | | CHECKERED PLUGGED FILTERS | | |
|---|---|---|---|---|---|---|
| FILTER DESCRIPTION* | Filter Efficiency (%) | Capacity (gm.) | Operating Time** (hrs.) | Filter Efficiency (%) | Capacity (gm.) | Operating Time** (hrs.) |
| Sample 1 | | | | | | |
| 50 cells/in.$^2$-0.025 in. | 95.2 | 10.9 | 1.6 | 95.0 | 9.2 | 1.4 |
| (7.75 cells/cm.$^2$-0.635 mm.) | 87.1 | 8.2 | | 96.4 | 8.0 | |
| Sample 2 | | | | | | |
| 100 cells/in.$^2$-0.012 in. | 97.8 | 10.7 | 3.0 | 94.6 | 28.2 | 2.1 |
| (15.5 cells/cm.$^2$-0.305 mm.) | | | | 95.3 | 29.8 | |
| Sample 3 | | | | | | |
| 100 cells/in.$^2$-0.017 in. | 97.4 | 16.6 | 3.2 | 96.0 | 25.4 | 3.5 |
| (15.5 cells/cm.$^2$-0.435 mm.) | 97.9 | 19.4 | | | | |
| Sample 4 | | | | | | |
| 100 cells/in.$^2$-0.017 in. | 68.7 | 20.6 | 4.0 | 69.7 | 32.9 | 4.7 |
| (15.5 cells/cm.$^2$-0.435 mm.) | 68.2 | 21.3 | | 60.1 | 29.4 | |
| Sample 5 | | | | | | |
| 100 cells/in.$^2$-0.025 in. | 94.7 | 13.1 | 1.8 | | | |
| (15.5 cells/cm.$^2$-0.635 mm.) | 98.4 | 9.9 | | | | |
| Sample 6 | | | | | | |
| 200 cells/in.$^2$-0.012 in. | 94.4 | 28.9 | 3.4 | | | |
| (31 cells/cm.$^2$-0.305 mm.) | 91.0 | 26.8 | | | | |

*All filters are cylindrical, approximately 12 inches long (30.5 cm.) and 3.66 inches (9.4 cm.) in diameter with plugs extending approximately ⅜-½ inch (about 9 -13 mm.) into the cells from each of the end faces. Transverse cross-sectional cell density and thin wall uniform thickness (both approximately) indicated.
**Operating Time to 140 cm. water back pressure; averaged where more than one sample tested; due to variations in base line particulates, times are only qualitatively comparable to one another.

TABLE 2

| FILTER TYPE | OPEN POROSITY (% Vol) | MEAN PORE DIAMETERS (Microns) |
|---|---|---|
| Sample 1 | | |
| 50 cells/in.$^2$-0.025 in. (7.75 cells/cm.$^2$-0.635 mm.) | 46.8 | 12 |
| Sample 2 | | |
| 100 cells/in.$^2$-0.012 in. (15.5 cells/cm.$^2$-0.305 mm.) | 48.0 | 11 |
| Sample 3 | | |
| 100 cells/in.$^2$-0.017 in. (15.5 cells/cm.$^2$-0.435 mm.) | 48.0 | 11 |
| Sample 4 | | |
| 100 cells/in.$^2$-0.017 in. (15.5 cells/cm.$^2$-0.435 mm.) | 65.8 | 15 |
| Sample 5 | | | thereafter plugged at each end face in the pattern depicted in FIGS. 1-3 to depths of about ⅜ to ½ in. (about 9.5-13 mm.) with the identified, preferred, manganese-magnesium cordierite foam-type cement using an air-operated sealant gun; and the substrate with plugs fired in accordance with the stated typical firing schedule for that cement. Filter bodies having identical substrate geometry and material compositions but with checkered plugging patterns were prepared for comparison with the alternate row plugged Samples 1-4. The open porosities and mean pore diameters of the thin walls of each of the six sample categories of Table 1 are listed in Table 2.

All sample filters were tested in the exhaust system of a 1980 Oldsmobile 350 CID (Cubic Inch Displacement)

(approximately 5.9 liter) diesel V-8 engine operated with a water brake dynamometer at a constant drive shaft speed of about 1,000 rpm and torque load of about 100 foot-pounds (approximately 136 joules) to simulate a higher than basic vehicle load operating at a steady 40 mph (64 kmph) speed on a horizontal, level road surface. A filter can containing a sample filter was provided for each bank of four engine cylinders and was located about 2.1 meters downstream from the engine exhaust manifold servicing the bank. Exhaust gas flow rate through each filter was approximately constant in the range of about 1.0 to 1.1 cubic meters per minute. Filter efficiencies were calculated from particulate levels measured downstream from the filter bodies and compared with base line particulate levels determined from measuring actual particulate content in unfiltered exhaust flows over the range of exhaust back pressures expected during filter testing. As the base line value shifted gradually over several months of testing, base line data was determined from measurements over shorter periods of time (one to three weeks) to calculate the efficiencies of filters run during that same time period. Full filter capacity was deemed to be achieved when a 140 cm. water back pressure was reached above the filter, as manufacturer data warned against operating the engine at higher back pressure. Particulate weight at full filter capacity (i.e. 140 cm. water back pressure) was determined by measuring actual weight gained by the filter. In cases where actual engine running time was different from the actual or estimated time to reach 140 cm. water back pressure, the measured weight gain was multiplied by the ratio of the interpolated time to reach 140 cm. water back pressure verses the actual engine running time. Sample filter efficiencies and capacities are listed in Table 1. Average efficiencies varied significantly for different geometry/material configuration although they were comparable between the row plugged and checkered plugged samples of the same configuration. Average efficiencies of three of the four row plugged samples (Samples 2, 3 and 4) were actually slightly greater than those of the corresponding checkered plugged samples. The ratios of the average capacities of the four alternate row plugged Samples 1-4 compared to the average capacities of the corresponding checkered plugged samples ranged from a low of about 37% (Sample 2) to a high of about 110% (Sample 1). The average capacities of three of the four alternate row plug samples were two-thirds or more the average capacities of the corresponding checkered plug samples (Samples 1, 3 and 4), much greater than the fifty percent value which would be expected if filtering occurred only along the cell surfaces between adjoining inlet and outlet cells. Particulate buildup was observed on all inlet surfaces of the alternate row plugged samples. It was further noted that the average capacity of the Sample 6 filters (27.85 gms) was about 85% that of checkered plugged filters of identical geometry and similar but not identical material composition and porosity. It can be seen in Table 1 that maximum capacity was achieved in the 100 cell/in.$^2$ (15.5 cells/cm.$^2$) density filters with 0.017 inch (0.435 mm) walls. The honeycomb substrates used for 100 cell/in.$^2$, 0.017 inch thick wall and 200 cell/in$^2$, 0.012 inch thick wall filters both have 69% open frontal area (i.e. the ratio of collective open cellular area at end face to total end face area).

The invention has been described thus far with respect to honeycomb filters having pluralities of cells extending in essentially the same direction between an inlet and outlet end face of the filter. It is envisioned that the invention may be used with other types of honeycomb filters such as the cross-flow-type filter depicted and described in the aforesaid U.S. Pat. No. 4,276,071 incorporated by reference herein. In that filter, inlet cells extended between a pair of opposing inlet end faces and were interspersed in layers between layers of outlet cells extending through the filter in a direction pependicular to the inlet cells and from an outlet end face extending between the inlet end faces. The inlet cells were open at both inlet end faces and closed at the outlet end face while the outlet cells were closed at the inlet end faces and open at the outlet end face. Filtration reportedly occurred only through the thin walls separating the layers of inlet and outlet cells. According to the present invention all of the thin walls, those separating layers of inlet and outlet cells and those between adjoining inlet and adjoining outlet cells would be provided with interconnected open porosity of a volume and size sufficient to allow a fluid to flow in any direction completely across and through the thin walls while preventing particulates from passing either completely across or through the thin walls in any direction. In this way, all internal surfaces of the inlet cells would be used for filtration. Alternatively, a single inlet and single outlet or single inlet and pair of outlet end faces can be provided in a crossflow-type filter.

While various embodiments of the invention and suggested modifications thereto have been described, it should be understood that other modifications could be made in the structure, composition and/or arrangement of the described embodiments without departing from the scope of the invention which is more fully defined in the following claims.

We claim:

1. In an apparatus for filtering solid particulates from fluids including a filter of honeycomb structure comprising:

a matrix of interconnected thin porous walls comprising at least one inlet end face and at least one outlet end face of the filter and a multiplicity of cells, each cell extending through the filter from at least one of the inlet or outlet end faces, an outlet group of cells each open at at least one outlet end face and closed at each adjoining inlet end face, an inlet group of cells each open at at least one inlet end face and closed at each adjoining outlet end face, substantially all cells of the inlet group each sharing at least one thin wall in common with another adjoining cell of the inlet group, and the thin walls containing interconnected open porosity of a volume and size sufficient to enable the fluid to flow completely across the narrow dimension and through the longer dimensions of the thin walls and to restrain most or all of the solid particulates from passing either completely across or completely through the thin walls in any direction, whereby filtering occurs through all thin walls defining each inlet cell.

2. The apparatus of claim 1 wherein the matrix comprises one inlet end face and one outlet end face on opposite sides of the filter and the multiplicity of cells extend longitudinally through the filter between the two end faces.

3. The apparatus of claim 1 wherein a substantial portion of the cells of said outlet group each shares at least one thin wall in common with another adjoining cell of the outlet group.

4. The apparatus of claim 1 wherein substantially all cells of the inlet group each shares at least two thin walls in common with other adjoining cells of the inlet group.

5. The apparatus of claim 1 wherein said thin walls are at least about 0.05 mm. thick and contain interconnected open porosity of at least about 25% by volume formed by pores having mean diameters of at least about 1 micron.

6. The apparatus of claim 5 wherein said multiplicity of cells are provided in average densities of at least about 1.5 cell/cm.$^2$ measured in planes perpendicular to their central longitudinal axes.

7. The apparatus of claim 6 wherein the interconnected open porosity of the thin walls is between about 40 and 70% by volume.

8. The apparatus of claim 7 wherein the mean diameters of the pores forming the interconnected open porosity of the thin walls are between about 1 and 60 microns.

9. The apparatus of claim 8 wherein the thin walls are provided in thicknesses of at least about 0.25 mm.

10. The apparatus of claim 9 wherein the cells are provided in average cellular densities of between about 3.75 and 31 cells/cm.$^2$ measured in planes perpendicular to their central longitudinal axes.

11. The apparatus of claim 1, 5 or 10 further including:
a diesel engine exhaust gas conduit, and
a portion of the conduit comprising a housing containing said filter interposed across the exhaust gas path through the housing with each inlet end face of the filter facing an upstream portion of the gas path.

12. The apparatus of claim 1 wherein the collective open cross-sectional area of the multiplicity of cells is about 70% of the total collective cross-sectional area of the multiplicity of cells.

13. The apparatus of claim 1 wherein said filter is formed from ceramic materials.

14. A method of fabricating a structure for filtering solid particulates from fluid passed through the body comprising the steps of:
providing a matrix of thin interconnected porous walls defining at least one inlet and one outlet end face and a multiplicity of cells extending substantially through the structure from an inlet or outlet end face, the walls containing interconnected open porosity of a volume and size sufficient to enable the fluid to flow completely across and through the thin walls in any direction, including through the longer dimensions of the thin walls, and to restrain at least a significant portion of the solid particulates in the fluid from passing either completely across or through the thin walls in any direction,
forming an inlet group of cells, each inlet cell being open at at least one inlet end face and closed along any adjoining outlet end face and some inlet cells sharing thin walls in common with other inlet cells; and
forming an outlet group of cells, each outlet cell being open at at least one outlet end face and closed along any adjoining inlet end face.

* * * * *